US012728645B2

(12) United States Patent
Onishi

(10) Patent No.: US 12,728,645 B2
(45) Date of Patent: Sep. 8, 2026

(54) PRINTING APPARATUS AND PRINTING METHOD

(71) Applicant: SCREEN Holdings Co., Ltd., Kyoto (JP)

(72) Inventor: Hideaki Onishi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 148 days.

(21) Appl. No.: 18/853,169

(22) PCT Filed: Mar. 16, 2023

(86) PCT No.: PCT/JP2023/010400

§ 371 (c)(1),
(2) Date: Oct. 1, 2024

(87) PCT Pub. No.: WO2023/195320

PCT Pub. Date: Oct. 12, 2023

(65) Prior Publication Data

US 2025/0242600 A1 Jul. 31, 2025

(30) Foreign Application Priority Data

Apr. 6, 2022 (JP) ................................ 2022-063207

(51) Int. Cl.
*B41J 2/18* (2006.01)
*B41J 2/17* (2006.01)
(Continued)

(52) U.S. Cl.
CPC ............ *B41J 2/185* (2013.01); *B41J 2/1707* (2013.01); *B41J 2/175* (2013.01)

(58) Field of Classification Search
CPC ..... B41J 2/18; B41J 2/185; B41J 2/175; B41J 2/17523; B41J 2/1707
See application file for complete search history.

(56) References Cited

U.S. PATENT DOCUMENTS

2010/0103208 A1 4/2010 Asami et al.
2016/0052259 A1* 2/2016 Sugitani ................ B41J 2/0454 347/17

(Continued)

FOREIGN PATENT DOCUMENTS

JP 2010-105169 A 5/2010
JP 2014-141032 A 8/2014

(Continued)

OTHER PUBLICATIONS

Notice of Allowance received in corresponding Japanese Patent Application No. 2022-063207, dated Aug. 19, 2025.

(Continued)

*Primary Examiner* — Jason S Uhlenhake
(74) *Attorney, Agent, or Firm* — Rimon P.C.

(57) ABSTRACT

The return pump which feeds the ink from the collection tank to the supply tank is provided, and the differential pressure generation assistance to feed the ink from the collection tank to the return pipe by the return liquid feeder is performed concurrently with the execution of the printing differential pressure generation. In the collection tank, the volume of the air layer above the gas-liquid interface is thereby expanded, to thereby decompress the air layer, and in the supply tank, the volume of the air layer above the gas-liquid interface is thereby compressed, to thereby pressurize the air layer. Thus, the generation of the differential pressure between the collection tank and the supply tank is assisted.

13 Claims, 8 Drawing Sheets

(51) Int. Cl.
*B41J 2/175* (2006.01)
*B41J 2/185* (2006.01)

(56) References Cited

U.S. PATENT DOCUMENTS

| | | | |
|---|---|---|---|
| 2016/0207317 A1 | 7/2016 | Miravet Jimenez et al. | |
| 2017/0173970 A1 | 6/2017 | Hori | |
| 2020/0094572 A1 | 3/2020 | Muto | |
| 2020/0101755 A1 | 4/2020 | Tsujino | |
| 2021/0078336 A1* | 3/2021 | Ikushima | B41J 2/17556 |
| 2021/0086520 A1 | 3/2021 | Suyama et al. | |
| 2021/0086521 A1 | 3/2021 | Suyama et al. | |
| 2023/0256750 A1* | 8/2023 | Kuramochi | B41J 29/38 347/89 |

FOREIGN PATENT DOCUMENTS

| | | |
|---|---|---|
| JP | 2015-167934 A | 9/2015 |
| JP | 2016-032900 A | 3/2016 |
| JP | 2017-109396 A | 6/2017 |
| JP | 2017-159668 A | 9/2017 |
| JP | 2018-158523 A | 10/2018 |
| JP | 2019-123090 A | 7/2019 |
| JP | 2020-044823 A | 3/2020 |
| JP | 2020-049826 A | 4/2020 |
| JP | 2021-045904 A | 3/2021 |
| JP | 2021-045932 A | 3/2021 |
| JP | 2021-146625 A | 9/2021 |
| JP | 2021-154562 A | 10/2021 |

OTHER PUBLICATIONS

International Search Report dated Apr. 25, 2023, from corresponding International Application No. PCT/JP2023/010400, 6 pages.

* cited by examiner

PRINTING APPARATUS AND PRINTING METHOD

CROSS-REFERENCE TO RELATED APPLICATIONS

This application is the U.S. National Phase under 35 U.S.C. § 371 of International Application No. PCT/JP2023/010400, filed on Mar. 16, 2023, which claims the benefit of foreign priority to Japan Patent Application No. 2022-063207 filed on Apr. 6, 2022, the entire contents of each of which are hereby incorporated by reference.

TECHNICAL FIELD

This invention relates to a printing technology for ejecting ink from an ejection head while feeding the ink from a supply ink storage through the ejection head, to a collected ink storage by a differential pressure generated between the supply ink storage storing the ink to be supplied to the ejection head and the collected ink storage storing the ink collected from the ejection head.

BACKGROUND TECHNOLOGY

Patent Literature 1 discloses a printing apparatus which performs printing by an ejection head for ejecting ink by an inkjet method. Especially, this printing apparatus includes a supply subtank for storing ink to be supplied to the ejection head and a collection subtank for storing ink collected from the ejection head, and generates a predetermined differential pressure between the supply subtank and the collection subtank by making a pressure inside the collection subtank lower than that inside the supply subtank. With this differential pressure, the ink is fed from the supply subtank through the ejection head to the collection subtank. Then, the ejection head ejects the ink supplied from the supply subtank.

PRIOR ART LITERATURE

Patent Literature

Patent Literature 1: Japanese Patent Application Laid Open Gazette No. 2021-146625

SUMMARY OF THE INVENTION

Problem to be Solved of the Invention

In order to supply ink required for printing to the ejection head, it is necessary to generate a sufficient differential pressure (printing differential pressure) between a supply ink storage (supply subtank) and a collected ink storage (collection subtank). Such generation of the printing differential pressure can be performed by a pressure adjustment part for adjusting a pressure inside the supply ink storage and a pressure adjustment part for adjusting a pressure inside the collected ink storage. There are some cases, however, where the printing differential pressure cannot be quickly generated by these pressure generation parts and it thereby takes a long time until the printing is started.

This invention is intended to solve the above-described problem, and it is an object of this invention to quickly generate a printing differential pressure between a supply ink storage and a collected ink storage and thereby make it possible to reduce the time until printing is started.

Solution to Problem

A printing apparatus according to the invention, comprises: an ejection head having a nozzle to eject ink: a supply ink storage which stores ink to be supplied to the ejection head: a collected ink storage which stores ink collected from the ejection head; a return liquid feeder which feeds ink from the collected ink storage to the supply ink storage; a first pressure adjustment part which adjusts a first pressure to be applied to a supply gas-liquid interface which is a boundary between the ink stored in the supply ink storage and air: a second pressure adjustment part which adjusts a second pressure to be applied to a collection gas-liquid interface which is a boundary between the ink stored in the collected ink storage and air; and a controller which performs a printing differential pressure generation to adjust the first pressure by the first pressure adjustment part so that the first pressure becomes a supply pressure and adjust the second pressure by the second pressure adjustment part so that the second pressure becomes a collection pressure lower than the supply pressure, wherein when the printing differential pressure generation is completed by adjusting the first pressure to the supply pressure and adjusting the second pressure to the collection pressure, performed is printing ink feeding to feed the ink from the supply ink storage through the ejection head to the collected ink storage by using a printing differential pressure which is a difference between the supply pressure and the collection pressure, the ejection head performs printing by ejecting the ink supplied from the supply ink storage along with the printing ink feeding, from the nozzle, and the controller performs liquid level preparation to generate a liquid level preparation state in which the supply gas-liquid interface is lower than a first preparation liquid level and the collection gas-liquid interface is equal to or higher than a second preparation liquid level before the printing differential pressure generation is completed after the printing performed by the ejection head is ended, and causes the return liquid feeder to perform differential pressure generation assistance to feed the ink from the collected ink storage to the supply ink storage concurrently with execution of the printing differential pressure generation.

A printing method according to the invention, comprises: performing printing differential pressure generation to adjust a first pressure by a first pressure adjustment part for adjusting the first pressure to be applied to a supply gas-liquid interface which is a boundary between air and ink stored in a supply ink storage for storing the ink to be supplied to an ejection head having a nozzle for ejecting the ink, so that the first pressure becomes a supply pressure, and to adjust a second pressure by a second pressure adjustment part for adjusting the second pressure to be applied to a collection gas-liquid interface which is a boundary between air and ink stored in a collected ink storage for storing the ink collected from the ejection head, so that the second pressure becomes a collection pressure lower than the supply pressure: performing printing ink feeding to feed the ink from the supply ink storage through the ejection head to the collected ink storage by using a printing differential pressure which is a difference between the supply pressure and the collection pressure by completing the printing differential pressure generation by adjusting the first pressure to the supply pressure and adjusting the second pressure to the collection pressure; and performing printing by the ejection head by ejecting the ink supplied from the supply ink storage along with the printing ink feeding, from the nozzle, wherein liquid level preparation to generate a liquid level preparation state in which the supply gas-liquid interface is lower than a first preparation liquid level and the collection gas-liquid interface is equal to or higher than a second preparation liquid level is performed before the printing differential pressure generation is completed, and differential pressure generation assistance to feed the ink from the collected ink storage to the supply ink storage by a return liquid feeder for feeding the ink from the collected ink storage to the supply ink storage is performed concurrently with execution of the printing differential pressure generation.

In the present invention (the printing apparatus and the printing method) having such a configuration, the first pressure adjustment part, which adjusts the first pressure to be applied to the gas-liquid interface (supply gas-liquid interface) inside the supply ink storage, and the second pressure adjustment part, which adjusts the second pressure to be applied to the gas-liquid interface (collection gas-liquid interface) inside the collected ink storage, are provided. Then, performed is the printing differential pressure generation to adjust the first pressure by the first pressure adjustment part so that the first pressure becomes the supply pressure and adjust the second pressure by the second pressure adjustment part so that the second pressure becomes the collection pressure lower than the supply pressure. With the difference (printing differential pressure) between the supply pressure and the collection pressure, which is generated by this printing differential pressure generation, performed is the printing ink feeding to feed the ink from the supply ink storage through the ejection head to the collected ink storage. Further, the ejection head performs the printing by ejecting the ink supplied from the supply ink storage along with the printing ink feeding, from the nozzle.

In the present invention, especially, the return liquid feeder, which feeds the ink from the collected ink storage to the supply ink storage, is provided. The return liquid feeder performs the differential pressure generation assistance to feed the ink from the collected ink storage to the supply ink storage concurrently with execution of the printing differential pressure generation. The volume of an air layer above the collection gas-liquid interface in the collected ink storage is thereby expanded, to thereby decompress the air layer, and the volume of an air layer above the supply gas-liquid interface in the supply ink storage is thereby compressed, to thereby pressurize the air layer. Thus, generation of the differential pressure between the collected ink storage and the supply ink storage is assisted. At that time, performed is the liquid level preparation to generate the liquid level preparation state in which the supply gas-liquid interface is lower than the first preparation liquid level and the collection gas-liquid interface is equal to or higher than the second preparation liquid level, before the printing differential pressure generation is completed. It is thereby possible to perform the differential pressure generation assistance after ensuring a range of compression of the air layer in the supply ink storage and a range of expansion of the air layer in the collected ink storage. As a result, it becomes possible to quickly generate the printing differential pressure between the supply ink storage and the collected ink storage and thereby reduce the time until the printing is started.

The printing apparatus may be configured so that the controller finishes the differential pressure generation assistance when the supply gas-liquid interface becomes equal to or higher than a first end liquid level. In such a configuration, it is possible to prevent the amount of ink stored in the supply ink storage from becoming excessively large along with the execution of the differential pressure generation assistance.

The printing apparatus may be configured so that the controller finishes the differential pressure generation assistance when the collection gas-liquid interface becomes lower than a second end liquid level. Further, the printing apparatus may be configured so that the controller should finish the differential pressure generation assistance when the collection gas-liquid interface becomes lower than the second end liquid level. In such a configuration, it is possible to prevent the amount of ink stored in the collected ink storage from becoming excessively small along with the execution of the differential pressure generation assistance.

The printing apparatus may be configured so that when the printing performed by the ejection head is ended, the controller performs the liquid level preparation by stopping feeding the ink from the collected ink storage to the supply ink storage, which is performed by the return liquid feeder, and raising the collection gas-liquid interface while lowering the supply gas-liquid interface. In such a configuration, it is possible to perform the liquid level preparation by using the differential pressure between the supply ink storage and the collected ink storage, which is generated at the point in time when the printing performed by the ejection head is ended.

The printing apparatus may be configured so that when the controller stops feeding the ink by the return liquid feeder for the liquid level preparation, the controller reduces a difference between the first pressure and the second pressure from the printing differential pressure by causing the first pressure adjustment part to adjust the first pressure and causing the second pressure adjustment part to adjust the second pressure. In such a configuration, a difference between the first pressure and the second pressure is reduced in advance before the pressure adjustment performed by the first pressure adjustment part and the second pressure adjustment part is stopped. For this reason, it is possible to alleviate an impact imposed on a meniscus of the ink formed on the nozzle at the stop of the pressure adjustment.

The printing apparatus may further comprise: a buffer ink storage which stores the ink: an ink replenishment part which feeds the ink from the buffer ink storage to the collected ink storage; and an ink collect part which feeds the ink from the supply ink storage to the buffer ink storage, wherein the controller performs the liquid level preparation by controlling liquid feeding of the ink from the buffer ink storage to the collected ink storage performed by the ink replenishment part and controlling liquid feeding of the ink from the supply ink storage to the buffer ink storage performed by the ink collect part. In such a configuration, it is possible to perform the liquid level preparation by replenishment of the ink from a buffer tank to the collected ink storage and collection of the ink from the supply ink storage to the buffer tank.

The printing apparatus may be configured so that the first pressure adjustment part has a first pressure tank connected to the supply ink storage and a first pressure generation part generating the supply pressure in the first pressure tank and applies the supply pressure generated in the first pressure tank to the supply gas-liquid interface of the supply ink storage, and the second pressure adjustment part has a second pressure tank connected to the collected ink storage and a second pressure generation part generating the collection pressure in the second pressure tank and applies the collection pressure generated in the second pressure tank to the collection gas-liquid interface of the collected ink storage. In such a configuration to generate the supply pressure and the collection pressure in the first and second pressure tanks, respectively, it takes time to generate the supply pressure and the collection pressure due to the capacities of the first and second pressure tanks. Then, by applying the present invention, it becomes preferable to quickly generate the printing differential pressure between the supply ink storage and the collected ink storage.

The printing apparatus may be configured so that the first pressure generation part has an introduction pipe, which introduces compressed air supplied from outside into the first pressure tank, and a first speed controller attached to the introduction pipe to limit inflow of the compressed air to the first pressure tank, and the second pressure generation part has an exhaust pump, which exhausts the second pressure tank, an exhaust pipe, which connects the exhaust pump and the second pressure tank to each other, and a second speed controller attached to the exhaust pipe to limit outflow of air from the second pressure tank to the exhaust pump. In such a configuration to limit the inflow of air to the first and second pressure tanks by using the first and second speed controllers, it takes time to generate the supply pressure and the collection pressure. Then, by applying the present invention, it becomes preferable to quickly generate the printing differential pressure between the supply ink storage and the collected ink storage.

The printing apparatus may further comprise: a purge execution part which performs purge to feed the ink from the supply ink storage to the ejection head and push the ink out from the nozzle of the ejection head by applying a purge pressure to the supply gas-liquid interface, wherein the purge execution part performs the purge before the printing differential pressure generation is started after the liquid level preparation is ended, and the controller causes the purge execution part to finish the purge in a state in which the supply gas-liquid interface becomes lower than the first preparation liquid level, along with execution of the purge by the purge execution part. In such a configuration, even when the liquid level preparation state generated in the liquid level preparation is broken along with the execution of the purge, it is possible to recover the liquid level preparation state at the end of the purge.

The printing apparatus may further comprise: a supply controller which controls liquid feeding of ink from the supply ink storage to the ejection head; and a collection controller which controls liquid feeding of ink from the ejection head to the collected ink storage, wherein the supply controller inhibits liquid feeding of ink from the supply ink storage to the ejection head during execution of the printing differential pressure generation while allowing liquid feeding of ink from the supply ink storage to the ejection head after the printing differential pressure generation is completed, and the collection controller inhibits liquid feeding of ink from the ejection head to the collected ink storage during execution of the printing differential pressure generation while allowing liquid feeding of ink from the ejection head to the collected ink storage after the printing differential pressure generation is completed. In such a configuration, during the execution of the printing differential pressure generation, the outflow of the ink from the supply ink storage and the inflow of the ink into the collected ink storage are inhibited. For this reason, it is possible to quickly generate the printing differential pressure.

The printing apparatus may be configured so that the differential pressure generation assistance is started after the liquid level preparation is completed.

The printing apparatus may be configured so that the printing differential pressure generation is started after the printing performed by the ejection head is ended and before the differential pressure generation assistance is started.

Advantageous Effects of Invention

Thus, according to the present invention, it becomes possible to quickly generate a printing differential pressure between a supply ink storage and a collected ink storage and thereby reduce the time until printing is started.

EMBODIMENT OF INVENTION

Figure 1:
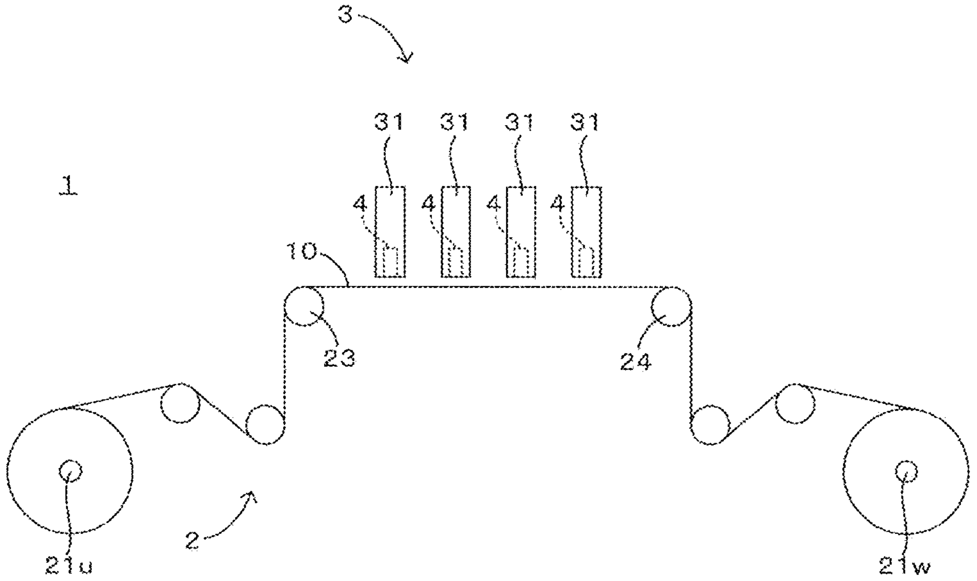
FIG. 1 A view schematically showing one example of a printing apparatus in accordance with the present invention.

FIG. 1 is a view schematically showing one example of a printing apparatus in accordance with the present invention. The printing apparatus 1 includes a transfer part 2 for transferring a printing medium 10 in a roll-to-roll manner and an ink ejection part 3 for ejecting ink onto the printing medium 10, and the ink ejection part 3 ejects ink onto the printing medium 10 in synchronization with the transfer of the printing medium 10 by the transfer part 2, to thereby print an image on the printing medium 10.

The transfer part 2 has a feed-out roller 21_u_ and a winding roller 21_w_, and the printing medium 10 fed out from the feed-out roller 21_u_ is wound around the winding roller 21_w_, to be thereby transferred. Further, the transfer part 2 has support rollers 23, 24 for supporting the printing medium 10 between the feed-out roller 21_u_ and the winding roller 21_w_, and the ink ejection part 3 ejects ink onto the printing medium 10 being transferred from the support roller 23 to the support roller 24. Furthermore, the transfer part 2 has rollers 25, 26 for supporting the printing medium 10 being transferred from the feed-out roller 21_u_ to the support roller 23 and rollers 27, 28 for supporting the printing medium 10 being transferred from the support roller 24 to the winding roller 21_w_.

The ink ejection part 3 has a plurality of head units 31 arrayed in a transfer direction of the printing medium 10. The plurality of head units 31 eject inks of respective different colors (for example, black, cyan, magenta, and yellow) by an inkjet method. Each of the ink ejection parts 3 has an ejection head 4 ejecting ink by an inkjet method.

Subsequently, the ejection head 4 and an ink feed mechanism which performs feeding of ink to the ejection head 4 will be described.

Figure 2:
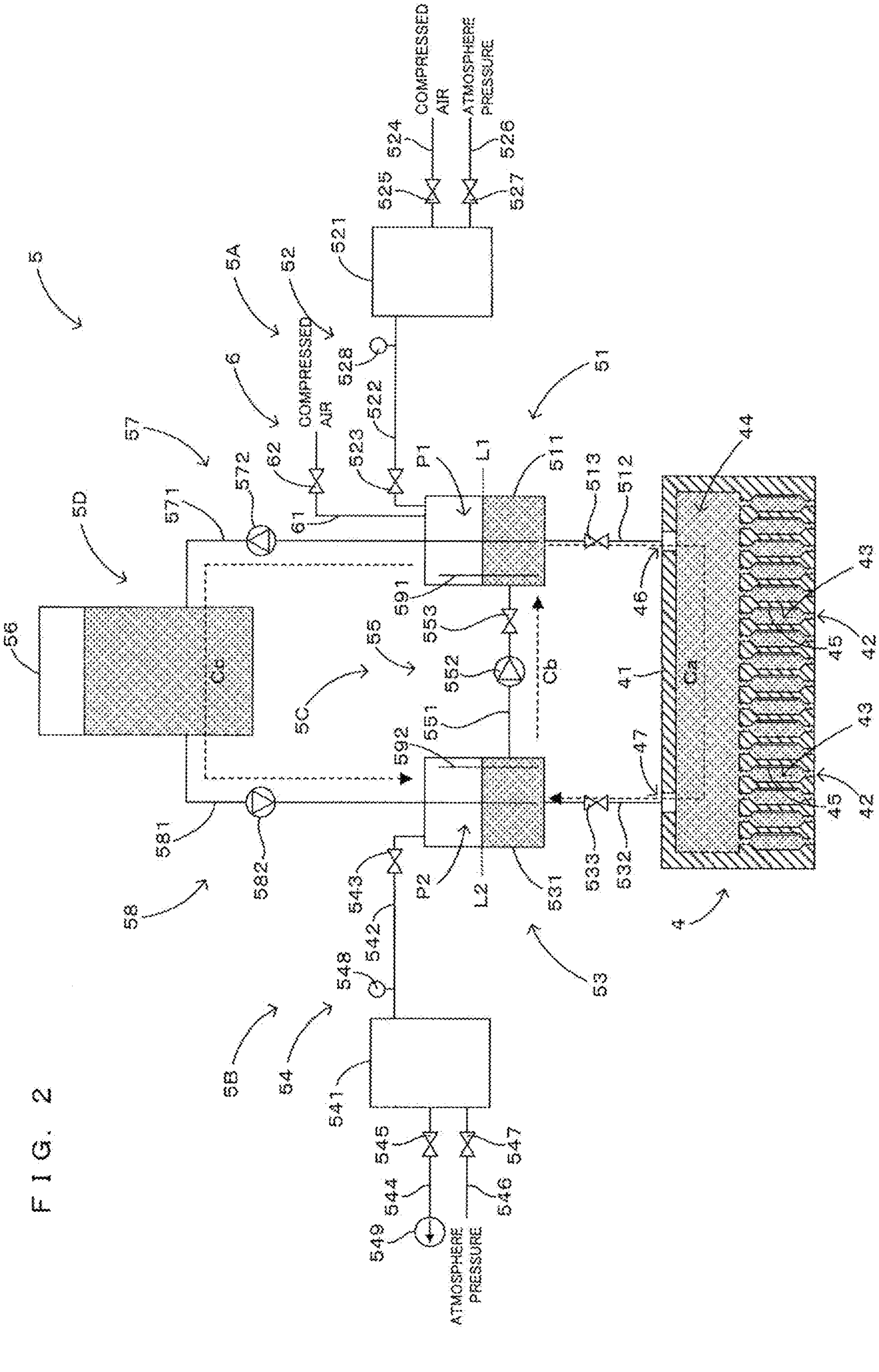
FIG. 2 A view schematically showing an ejection head and an ink feed mechanism provided for the ejection head.
Figure 3:
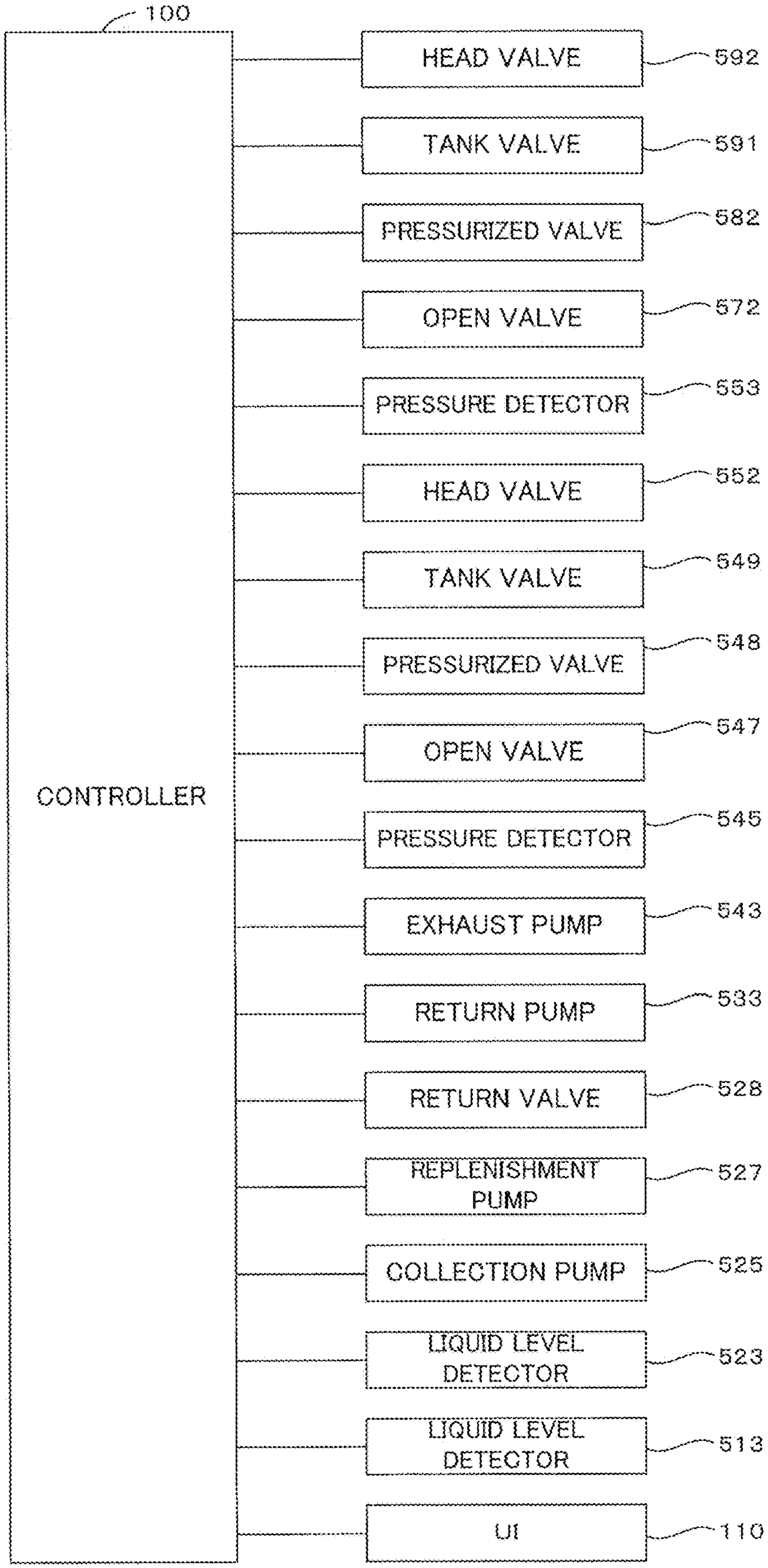
FIG. 3 A block diagram showing an electrical configuration included in the printing apparatus to control the ink feed mechanism of FIG. 2.

FIG. 2 is a view schematically showing the ejection head 4 and the ink feed mechanism provided for the ejection head 4, and FIG. 3 is a block diagram showing an electrical configuration included in the printing apparatus to control the ink feed mechanism of FIG. 2. As shown in FIG. 3, the printing apparatus 1 includes a controller 100. The controller 100 is formed of a processor such as a CPU (Central Processing Unit) or an FPGA (Field Programmable Gate Array) or the like, and a memory or the like. Further, the printing apparatus 1 includes a UI (User Interface) 110. The UI 110 is formed of, for example, a touch panel display, and receives an input operation by an operator and sends the input operation to the controller 100 or displays information to the operator on the basis of a command of the controller 100.

As shown in FIG. 2, the ejection head 4 has a housing 41. On a bottom surface of the housing 41, a plurality of nozzles 42 are arranged in a staggered manner in a horizontal direction and open. Inside the housing 41, provided are a plurality of cavities 43 communicating with the plurality of nozzles 42, respectively, and an ink supply chamber 44 communicating with the plurality of cavities 43, and each of the cavities 43 stores ink supplied from the ink supply chamber 44. Further, each cavity 43 is provided with a piezoelectric element 45, and the piezoelectric element 45 is displaced in response to a drive signal (electrical signal), to thereby apply pressure fluctuation to the ink inside the cavity 43. With this pressure fluctuation, the ink is pushed out form the cavity 43 and ejected from the nozzle 42 communicating with this cavity 43. Furthermore, in an upper portion of the housing 41, an ink inflow port 46 and an ink outflow port 47 open. Then, as described next, the ink flowing from the ink feed mechanism 5 through the ink inflow port 46 into the ink supply chamber 44 flows out to the ink feed mechanism 5 from the ink supply chamber 44 through the ink outflow port 47.

The printing apparatus 1 includes the ink feed mechanism 5 shown in FIG. 2. This ink feed mechanism 5 has an ink supply part 5A which supplies ink to the ejection head 4, an ink collector 5B which collects the ink from the ejection head 4, an ink return part 5C which feeds the ink from the ink collector 5B to the ink supply part 5A, and an ink feed amount adjustment part 5D which adjusts the amount of ink to be fed to the ejection head 4.

The ink supply part 5A has a supply liquid feeder 51 which supplies ink to the ejection head 4. The supply liquid feeder 51 has a supply tank 511 which stores the ink to be supplied to the ejection head 4 and a pipe 512 which connects the supply tank 511 and the ink inflow port 46 of the ejection head 4 to each other, and the ink is fed from the supply tank 511 through the pipe 512 to the ejection head 4. Further, the supply liquid feeder 51 has a head valve 513 provided in the pipe 512. When the controller 100 opens the head valve 513, feeding of the ink from the supply tank 511 through the pipe 512 to the ejection head 4 is allowed. When the controller 100 closes the head valve 513, feeding of the ink from the supply tank 511 through the pipe 512 to the ejection head 4 is inhibited.

Further, the ink supply part 5A has a pressure adjustment part 52 which adjusts a pressure P1 inside the supply tank 511. Specifically, inside the supply tank 511, air is accumulated to form an air layer above a gas-liquid interface L1 which is a liquid surface of the ink, and the pressure adjustment part 52 adjusts the pressure P1 to be applied onto the gas-liquid interface L1. The pressure adjustment part 52 has a pressure tank 521 which stores air, a pipe 522 which connects respective air layers of the pressure tank 521and the supply tank 511 to each other, and a tank valve 523 attached to the pipe 522. When the controller 100 opens the tank valve 523, the pressure tank 521 and the supply tank 511 communicate with each other through the pipe 522, and pressures of the respective air layers in the pressure tank 521 and the supply tank 511 become equal to each other. When the controller 100 closes the tank valve 523, the pressure tank 521 and the supply tank 511 are shut off from each other. In this embodiment, the tank valve 523 is basically always opened.

The pressure adjustment part 52 has an introduction pipe 524 which introduce compressed air into the pressure tank 521 and a pressurized valve 525 attached to the introduction pipe 524. When the controller 100 opens the pressurized valve 525, the compressed air is introduced from the introduction pipe 524 into the pressure tank 521 and the air layer inside the pressure tank 521 is thereby pressurized. When the controller 100 closes the pressurized valve 525, the introduction of the compressed air from the introduction pipe 524 into the pressure tank 521 is inhibited. Further, the pressure adjustment part 52 has an introduction pipe 526 which introduces atmosphere pressure into the pressure tank 521 and an open valve 527 attached to the introduction pipe 526. When the controller 100 opens the open valve 527, the pressure tank 521 becomes open to the atmosphere pressure through the introduction pipe 526. When the controller 100 closes the open valve 527, the pressure tank 521 is shut off from the atmosphere pressure.

Further, the pressure adjustment part 52 has a pressure detector 528 attached to the pipe 522 between the pressure tank 521 and the tank valve 523, and the pressure detector 528 detects the pressure inside the pipe 522, i.e., the pressure inside the pressure tank 521 and outputs it to the controller 100. Therefore, the controller 100 can adjust the pressure P1 to be applied on the gas-liquid interface L1 in the supply tank 511 by controlling opening/closing of the pressurized valve 525 and the open valve 527 on the basis of the detected pressure obtained by the pressure detector 528 in a state in which the tank valve 523 is opened to cause the supply tank 511 and the pressure tank 521 to communicate with each other.

The ink collector 5B has a collection liquid feeder 53 which collects the ink from the ejection head 4. The collection liquid feeder 53 has a collection tank 531 which stores the ink collected from the ejection head 4 and a pipe 532 which connects the collection tank 531 and the ink outflow port 47 of the ejection head 4 to each other, and the ink is fed from the ejection head 4 through the pipe 532 to the collection tank 531. Further, the collection liquid feeder 53 has a head valve 533 provided in the pipe 532. When the controller 100 opens the head valve 533, feeding of the ink from the ejection head 4 through the pipe 532 to the collection tank 531 is allowed. When the controller 100 closes the head valve 533, feeding of the ink from the ejection head 4 through the pipe 532 to the collection tank 531 is inhibited.

Further, the ink collector 5B has a pressure adjustment part 54 which adjusts a pressure P2 inside the collection tank 531. Specifically, inside the collection tank 531, air is accumulated to form an air layer above a gas-liquid interface L2 which is a liquid surface of the ink, and the pressure adjustment part 54 adjusts the pressure P2 to be applied onto the gas-liquid interface L2. The pressure adjustment part 54 has a pressure tank 541 which stores air, a pipe 542 which connects respective air layers of the pressure tank 541 and the collection tank 531 to each other, and a tank valve 543 attached to the pipe 542. When the controller 100 opens the tank valve 543, the pressure tank 541 and the collection tank 531 communicate with each other through the pipe 542, and pressures of the respective air layers in the pressure tank 541 and the collection tank 531 become equal to each other. When the controller 100 closes the tank valve 543, the pressure tank 541 and the collection tank 531 are shut off from each other. In this embodiment, the tank valve 543 is basically always opened.

The pressure adjustment part 54 has an exhaust pipe 544 which connects an exhaust pump 549 and the pressure tank 541 to each other and an exhaust valve 545 attached to the exhaust pipe 544. When the controller 100 opens the exhaust valve 545, the exhaust pump 549 exhausts the collection tank 531 through the exhaust pipe 544 and the air layer inside the collection tank 531 is thereby decompressed. When the controller 100 closes the exhaust valve 545, the exhaust of the collection tank 531 through the exhaust pipe 544 by the exhaust pump 549 is inhibited. Further, the pressure adjustment part 54 has an introduction pipe 546 which introduces atmosphere pressure into the pressure tank 541 and an open valve 547 attached to the introduction pipe 546. When the controller 100 opens the open valve 547, the pressure tank 541 becomes open to the atmosphere pressure through the introduction pipe 546. When the controller 100 closes the open valve 547, the pressure tank 541 is shut off from the atmosphere pressure.

Further, the pressure adjustment part 54 has a pressure detector 548 attached to the pipe 542 between the pressure tank 541 and the tank valve 543, and the pressure detector 548 detects the pressure inside the pipe 542, i.e., the pressure inside the pressure tank 541 and outputs it to the controller 100. Therefore, the controller 100 can adjust the pressure P2 to be applied on the gas-liquid interface L2 in the collection tank 531 by controlling opening/closing of the exhaust valve 545 and the open valve 547 on the basis of the detected pressure obtained by the pressure detector 548 in a state in which the tank valve 543 is opened to cause the collection tank 531 and the pressure tank 541 to communicate with each other while causing the exhaust pump 549 to perform the exhaust operation.

In the above-described configuration, the controller 100 adjusts the pressure P1 inside the supply tank 511 to a supply pressure Pf by the pressure adjustment part 52 and adjusts the pressure P2 inside the collection tank 531 to a collection pressure Pr lower than the supply pressure Pf by the pressure adjustment part 54. Herein, the supply pressure Pf is a positive pressure higher than the atmosphere pressure and the collection pressure Pr is a negative pressure lower than the atmosphere pressure. Thus, a printing differential pressure $\Delta Pp=(Pf-Pr)$ is generated between the supply tank 511 and the collection tank 531. When this printing differential pressure $\Delta Pp$ is generated in a state in which the head valve 513 and the head valve 533 are opened, the ink is fed along a liquid feed path Ca reaching the collection tank 531 from the supply tank 511 through the ejection head 4.

The ink return part 5C has a return liquid feeder 55 which feeds the ink from the collection tank 531 to the supply tank 511. The return liquid feeder 55 has a return pipe 551 which connects the collection tank 531 and the supply tank 511 to each other and a return pump 552 provided in the return pipe 551 between the collection tank 531 and the supply tank 511. This return pump 552 feeds the ink from the collection tank 531 toward the supply tank 511. Therefore, the controller can feed the ink along a liquid feed path Cb reaching the supply tank 511 from the collection tank 531 through the return pipe 551 by causing the return pump 552 to feed the ink. Further, the return liquid feeder 55 has a return valve 553 attached to the return pipe 551 between the return pump 552 and the supply tank 511. When the controller 100 opens the return valve 553, feeding of the ink along the liquid feed path Cb by the return pump 552 is allowed, and when the controller 100 closes the return valve 553, feeding of the ink along the liquid feed path Cb by the return pump 552 is inhibited.

The ink feed amount adjustment part 5D has a buffer tank 56, a collection liquid feeder 57 which collects the ink from the supply tank 511 to the buffer tank 56, and a replenishment liquid feeder 58 which replenishes the ink from the buffer tank 56 into the collection tank 531. The buffer tank 56 stores the ink with a capacity larger than that of each of the supply tank 511 and the collection tank 531. The collection liquid feeder 57 has a collection pipe 571 which connects the supply tank 511 and the buffer tank 56 to each other and a collection pump 572 attached to the collection pipe 571 between the supply tank 511 and the buffer tank 56. This collection pump 572 feeds the ink along the collection pipe 571 from the supply tank 511 toward the buffer tank 56. The replenishment liquid feeder 58 has a replenishment pipe 581 which connects the buffer tank 56 and the collection tank 531 to each other and a replenishment pump 582 attached to the replenishment pipe 581 between the buffer tank 56 and the collection tank 531. This replenishment pump 582 feeds the ink along the replenishment pipe 581 from the buffer tank 56 toward the collection tank 531. Therefore, the controller 100 can feed the ink along a liquid feed path Cc reaching the collection tank 531 from the supply tank 511 through the buffer tank 56 by causing the collection pump 572 and the replenishment pump 582 to feed the ink.

Further, the ink feed mechanism 5 has a liquid level detector 591 which detects the gas-liquid interface L1 of the ink stored in the supply tank 511 and a liquid level detector 592 which detects the gas-liquid interface L2 of the ink stored in the collection tank 531. A detected liquid level obtained by the liquid level detector 591 is sent from the liquid level detector 591 to the controller 100 and a detected liquid level obtained by the liquid level detector 592 is sent from the liquid level detector 592 to the controller 100.

Furthermore, as shown in FIG. 2, the printing apparatus 1 has a purge mechanism 6. The purge mechanism 6 has an introduction pipe 61 which introduces compressed air into the air layer in the supply tank 511 and a purge valve 62 attached to the introduction pipe 61. When the controller 100 opens the purge valve 62, the compressed air is introduced from the introduction pipe 61 onto the gas-liquid interface L1 inside the supply tank 511 and this compressed air pushes down the gas-liquid interface L1. As a result, the ink flows into the ejection head 4 from the supply tank 511 through the pipe 512 and flows out from the nozzle 42 of the ejection head 4 (purge). Further, the controller 100 can allow the purge by opening the head valve 513 to cause the ink to flow into the ejection head 4 from the supply tank 511 and on the other hand, the controller 100 can inhibit the purge by closing the head valve 513.

Figure 4:
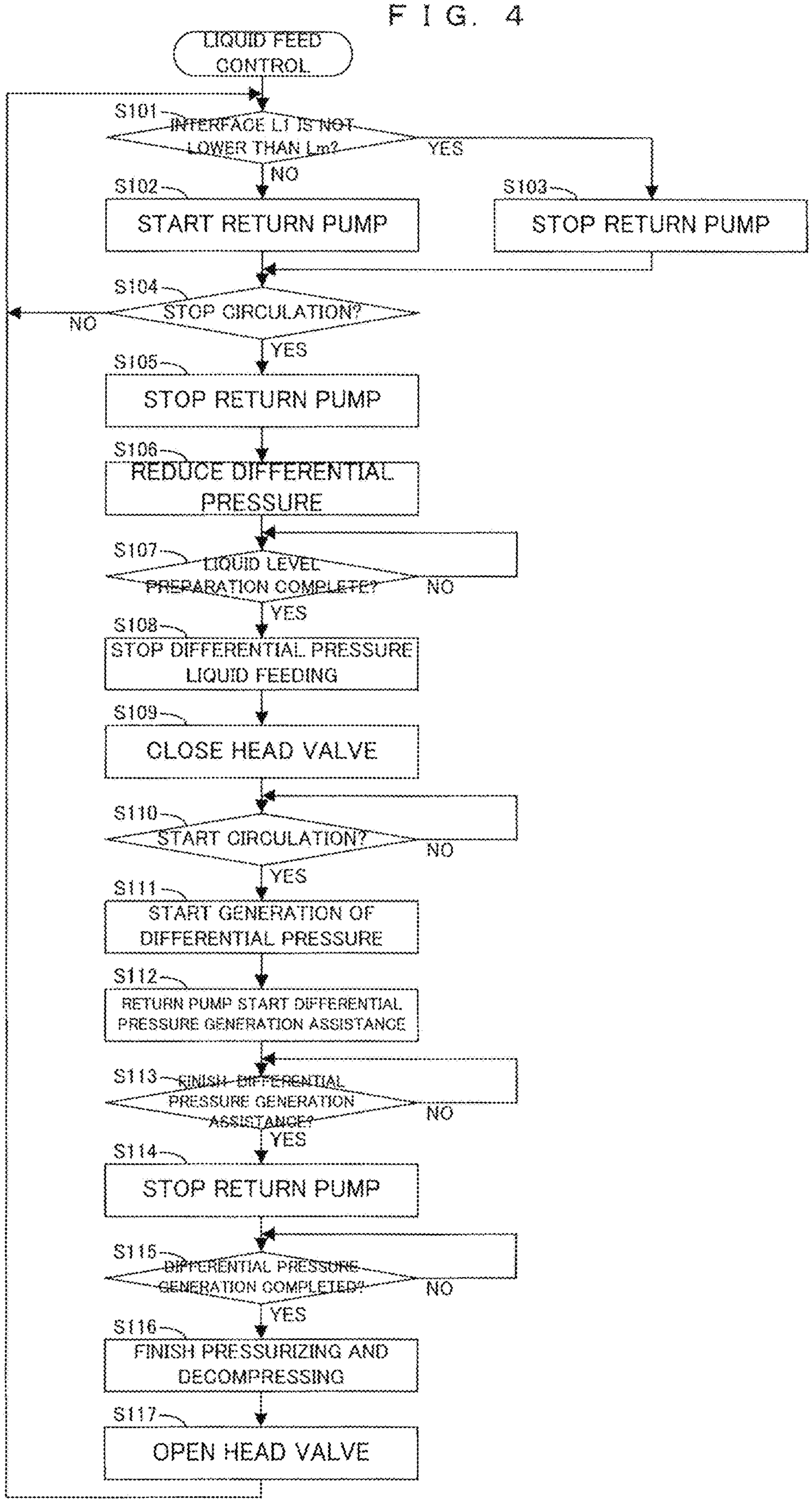
FIG. 4 A flowchart showing one example of liquid feed control performed in the printing apparatus of FIG. 1.
Figure 5A:
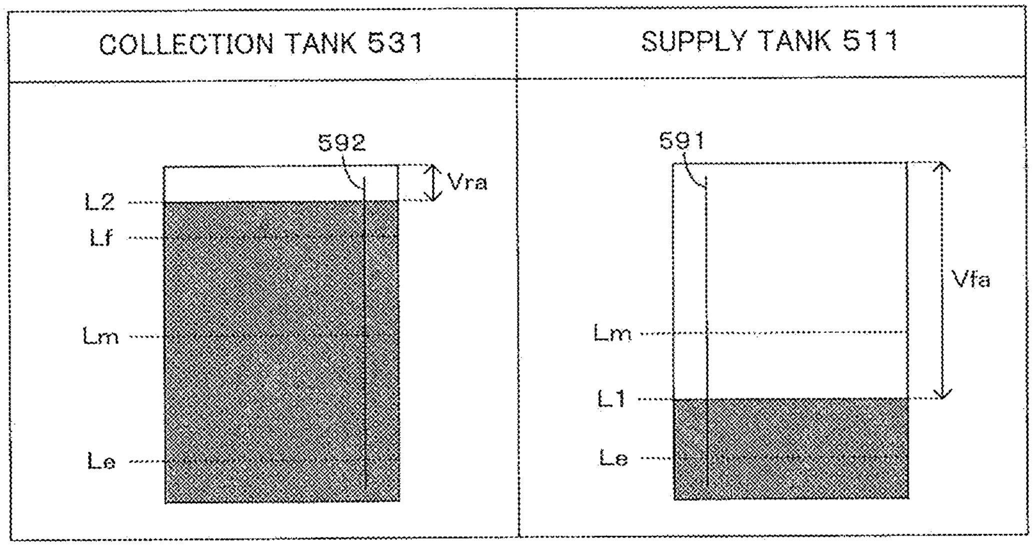
FIG. 5A A view schematically showing one example of an operation performed along with the flowchart of FIG. 4.
Figure 5B:
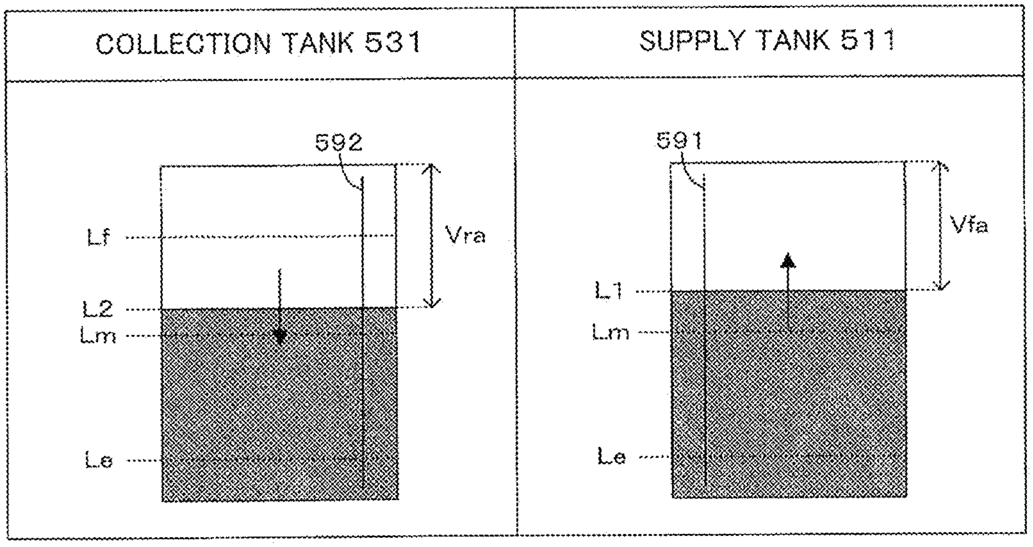
FIG. 5B A view schematically showing one example of the operation performed along with the flowchart of FIG. 4.

FIG. 4 is a flowchart showing one example of liquid feed control performed in the printing apparatus of FIG. 1, and FIGS. 5A and 5B are views each schematically showing one example of an operation performed along with the flowchart of FIG. 4. The flowchart shown in FIG. 4 is executed by the controller 100. FIGS. 5A and 5B each show levels (heights) Le, Lm, Lf at which the ink is detected. Herein, a middle level Lm is higher than an empty level Le, and a full level Lf is higher than the middle level Lm.

The liquid level detector 591, which detects the ink inside the supply tank 511, detects presence or absence of ink at the empty level Le and the middle level Lm. When the liquid level detector 591 detects ink at the middle level Lm, the controller 100 can determine that the gas-liquid interface L1 inside the supply tank 511 is equal to or higher than the middle level Lm. When the liquid level detector 591 does not detect ink at the middle level Lm and detects ink at the empty level Le, the controller 100 can determine that the gas-liquid interface L1 inside the supply tank 511 is equal to or higher than the empty level Le and lower than the middle level Lm. When the liquid level detector 591 does not detect ink at the empty level Le, the controller 100 can determine that the gas-liquid interface L1 inside the supply tank 511 is lower than the empty level Le.

The liquid level detector 592, which detects the ink inside the collection tank 531, detects presence or absence of ink at the empty level Le, the middle level Lm, and the full level Lf. When the liquid level detector 592 detects ink at the full level Lf, the controller 100 can determine that the gas-liquid interface L2 inside the collection tank 531 is equal to or higher than the full level Lf. When the liquid level detector 592 does not detect ink at the full level Lf and detects ink at the middle level Lm, the controller 100 can determine that the gas-liquid interface L2 inside the collection tank 531 is equal to or higher than the middle level Lm and lower than the full level Lf. When the liquid level detector 592 does not detect ink at the middle level Lm and detects ink at the empty level Le, the controller 100 can determine that the gas-liquid interface L2 inside the collection tank 531 is equal to or higher than the empty level Le and lower than the middle level Lm. When the liquid level detector 592 does not detect ink at the empty level Le, the controller 100 can determine that the gas-liquid interface L2 inside the collection tank 531 is lower than the empty level Le.

The liquid level detector 591 and the liquid level detector 592 as described above can be each formed of a plurality of float sensors or the like provided at different heights. Further, the levels Le and Lm set for the supply tank 511 do not necessarily need to be equal to the levels Le and Lm set for the collection tank 531, respectively.

In Steps S101 to S103 of FIG. 4, the ink is fed along the liquid feed path Ca by the printing differential pressure ΔPp generated between the supply tank 511 and the collection tank 531, and the ejection head 4 ejects the ink from the nozzle 42, to thereby perform printing. During the execution of such printing, the controller 100 monitors whether or not the gas-liquid interface L1 inside the supply tank 511 is equal to or higher than the middle level Lm on the basis of the detection result of the liquid level detector 591 (Step S101). Then, when the gas-liquid interface L1 is not equal to or higher than the middle level Lm ("NO" in Step S101), the controller 100 starts the return pump 552 to feed the ink along the liquid feed path Cb from the collection tank 531 to the supply tank 511 (Step S103). The gas-liquid interface L1 inside the supply tank 511 thereby rises. On the other hand, when the gas-liquid interface L1 is equal to or higher than the middle level Lm ("YES" in Step S101), the controller 100 stops the return pump 552 to stop feeding of the ink along the liquid feed path Cb from the collection tank 531 to the supply tank 511 (Step S103). The gas-liquid interface L1 inside the supply tank 511 thereby stops rising.

Further, during the execution of Steps S101 to S103, when it is confirmed that the liquid level of the gas-liquid interface L2 inside the collection tank 531 is reduced along with the ejection of the ink from the ejection head 4 which performs the printing, the controller 100 causes the replenishment pump 582 to feed ink from the buffer tank 56 to the collection tank 531, to thereby replenish ink in the collection tank 531. Furthermore, the collection pump 572 may be basically being stopped.

Such a control of the gas-liquid interface L1 by the controller 100 (Steps S101 to S103) is performed until it is determined in Step S104 to stop the circulation. When the printing performed concurrently with Steps S101 to S103 is finished and further no next printing is planned, or when the operator inputs a command indicating the stop of the circulation to the UI 110, for example, it is determined to stop the circulation. Herein, the circulation refers to an operation of feeding ink along the liquid feed path Cb by the return pump 552 while feeding ink along the liquid feed path Ca by the printing differential pressure ΔPp, and in other words, an operation of feeding ink by the control in Steps S101 to S103.

In Step S104, when it is determined to stop the circulation ("YES"), the controller 100 stops the return pump 552 (Step S105). Further, the controller 100 reduces a differential pressure between the pressure P1 and the pressure P2 from the printing differential pressure ΔPp (Step S106). This reduction of the differential pressure can be performed by intermittently opening the open valve 527 and the open valve 547 to thereby cause the supply tank 511 and the collection tank 531 to intermittently become open to the atmosphere.

Since the return pump 552 is stopped in Step S105, feeding of the ink along the liquid feed path Cb from the collection tank 531 is inhibited. On the other hand, the differential pressure between the pressure P1 and the pressure P2 is lower than the printing differential pressure ΔPp but higher than 0 and the pressure P2 is lower than the pressure P1. Therefore, the ink is fed from the supply tank 511 through the liquid feed path Ca to the collection tank 531. As a result, the gas-liquid interface L1 inside the supply tank 511 is lowered with the passage of time and the gas-liquid interface L2 inside the collection tank 531 rises with the passage of time. The controller 100 executes Steps S105 and S106, to thereby adjust the gas-liquid interface L1 and the gas-liquid interface L2 to a liquid level state (liquid level preparation state) shown in FIG. 5A (liquid level preparation).

In the liquid level state shown in FIG. 5A, the gas-liquid interface L1 inside the supply tank 511 is lower than the middle level Lm and the gas-liquid interface L2 inside the collection tank 531 is equal to or higher than the full level Lf (liquid level preparation state). In other words, when the gas-liquid interface L1 becomes lower than the middle level Lm and the gas-liquid interface L2 becomes equal to or higher than the full level Lf, the controller 100 determines that the liquid level preparation is completed and stops feeding of the ink (differential pressure liquid feeding) along the liquid feed path Ca by the differential pressure between the pressure P1 and the pressure P2 (Step S108). Specifically, the differential pressure liquid feeding can be stopped by closing the pressurized valve 525 and opening the open valve 527 to thereby bring the pressure P1 into the atmosphere pressure and closing the exhaust valve 545 and opening the open valve 547 to thereby bring the pressure P2 into the atmosphere pressure. Then, the controller 100 closes the head valve 513 and the head valve 533, to thereby inhibit feeding of the ink from the supply tank 511 to the ejection head 4 and feeding of the ink from the ejection head 4 to the collection tank 531 (Step S109).

In Step S110, the controller 100 determines whether to start the circulation. When a command indicating execution of printing is inputted to the UI 110, for example, the controller 100 determines to start the circulation ("YES" in Step S110), and the controller 100 starts generation of the differential pressure (Step S111). Specifically, the controller 100 closes the open valve 527 and opens the pressurized valve 525, to thereby start pressurizing the inside of the supply tank 511. Further, the controller 100 closes the open valve 547 and opens the exhaust valve 545, to thereby start decompressing the inside of the collection tank 531. The pressure P1 inside the supply tank 511 thereby rises and the pressure P2 inside the collection tank 531 is thereby lowered, and the difference (differential pressure) between the pressure P1 and the pressure P2 increases. At that time, the head valve 513 and the head valve 533 are closed, and feeding of ink along the liquid feed path Ca reaching the collection tank 531 from the supply tank 511 through the ejection head 4 is inhibited.

Further, the controller 100 starts the return pump 552 (Step S112), to thereby feed the ink from the collection tank 531 through the liquid feed path Cb to the supply tank 511. As shown in FIG. 5B, the gas-liquid interface L1 in the supply tank 511 thereby rises and the air layer Vfa above the gas-liquid interface L1 is compressed. For this reason, the air layer Vfa is pressurized and the pressure P1 rises. Further, in the collection tank 531, the gas-liquid interface L2 is lowered and the air layer Vra above the gas-liquid interface L2 is expanded. For this reason, the air layer Vra is decompressed and the pressure P2 is lowered. In other words, the feeding by the return pump 552 assists generation of the differential pressure between the pressure P1 and the pressure P2.

In Step S113, the controller 100 determines whether or not the end condition for the differential pressure generation assistance by ink feeding performed by the return pump 552 is satisfied. Specifically, when at least one of the following conditions is satisfied, it is determined that the end condition is satisfied ("YES" in Step S113);

- the gas-liquid interface L1 inside the supply tank 511 is equal to or higher than the middle level Lm, and
- the gas-liquid interface L2 inside the collection tank 531 is lower than the empty level Le.

Thus, when the end condition is satisfied, the controller 100 stops the return pump 552 (Step S114). Feeding of the ink from the collection tank 531 through the liquid feed path Cb to the supply tank 511 is thereby stopped.

Further, the controller 100 determines whether or not the generation of the differential pressure is completed. Specifically, the controller 100 determines whether or not the differential pressure between the pressure P1 inside the supply tank 511 and the pressure P2 inside the collection tank 531 becomes the printing differential pressure ΔPp on the basis of the respective detected pressures of the pressure detector 528 and the pressure detector 548 (Step S115). Then, when the differential pressure between the pressure P1 and the pressure P2 becomes the printing differential pressure ΔPp ("YES" in Step S115), the controller 100 finishes pressurizing the inside of the supply tank 511 and finishes decompressing the inside of the collection tank 531 (Step S116). In other words, the pressurized valve 525 and the exhaust valve 545 are closed. Next, the head valve 513 and the head valve 533 are opened (Step S117). Feeding of the ink along the liquid feed path Ca reaching the collection tank 531 from the supply tank 511 through the ejection head 4 is thereby started. Then, the process goes back to Step S101 and the liquid feed control of the ink for performing the printing is started (Steps S101 to S103).

In the above-described embodiment, provided are the pressure adjustment part 52 (first pressure adjustment part), which adjusts the pressure P1 (first pressure) to be applied to the gas-liquid interface L1 (supply gas-liquid interface) inside the supply tank 511 (supply ink storage), and the pressure adjustment part 54 (second pressure adjustment part), which adjusts the pressure P2 (second pressure) to be applied to the gas-liquid interface L2 (collection gas-liquid interface) inside the collection tank 531 (collected ink storage). Then, performed is the printing differential pressure generation to adjust the pressure P1 by the pressure adjustment part 52 so that the pressure P1 can become the supply pressure Pf and adjust the pressure P2 by the pressure adjustment part 54 so that the pressure P2 can become the collection pressure Pr lower than the supply pressure Pf (Step S111). The printing ink feeding to feed the ink from the supply tank 511 through the ejection head 4 to the collection tank 531 by the printing differential pressure ΔPp which is the difference between the supply pressure Pf and the collection pressure Pr, which are generated by the printing differential pressure generation, is performed. Further, the ejection head 4 ejects the ink, which is supplied from the supply tank 511 along with the printing ink feeding, from the nozzle 42, to thereby perform the printing.

In this embodiment, especially, the return pump 552 which feeds the ink from the collection tank 531 to the supply tank 511 is provided, and the differential pressure generation assistance to feed the ink from the collection tank 531 to the return pipe 551 by the return liquid feeder 55 is performed concurrently with the execution of the printing differential pressure generation (Step S112). In the collection tank 531, the volume of the air layer Vra above the gas-liquid interface L2 is thereby expanded, to thereby decompress the air layer Vra, and in the supply tank 511, the volume of the air layer Vfa above the gas-liquid interface L1 is thereby compressed, to thereby pressurize the air layer Vfa. Thus, the generation of the differential pressure between the collection tank 531 and the supply tank 511 is assisted. At that time, before the printing differential pressure generation (Step S111) is started, the liquid level preparation to generate the liquid level preparation state (FIG. 5A) in which the gas-liquid interface L1 inside the supply tank 511 is at the middle level Lm (lower than the first preparation liquid level) and the gas-liquid interface L2 inside the collection tank 531 is at the full level Lf (equal to or higher than the second preparation liquid level) is performed (Steps S105 to S107). It is thereby possible to perform the differential pressure generation assistance (Step S112) after ensuring the range of compression of the air layer Vfa in the supply tank 511 and the range of expansion of the air layer Vra in the collection tank 531. As a result, it becomes possible to quickly generate the printing differential pressure ΔPp between the supply tank 511 and the collection tank 531 and thereby reduce the time until the printing is started.

Further, the controller 100 finishes the differential pressure generation assistance (Step S113) when the gas-liquid interface L1 inside the supply tank 511 becomes equal to or higher than the middle level Lm (first end liquid level). In such a configuration, it is possible to prevent the amount of ink stored in the supply tank 511 from becoming excessively large along with the execution of the differential pressure generation assistance.

Furthermore, the controller 100 finishes the differential pressure generation assistance (Step S113) when the gas-liquid interface L2 inside the collection tank 531 becomes lower than the empty level Le (second end liquid level). In such a configuration, it is possible to prevent the amount of ink stored in the collection tank 531 from becoming excessively small along with the execution of the differential pressure generation assistance.

Further, when the printing performed by the ejection head 4 concurrently with Steps S101 to S103 is ended, the controller 100 stops feeding of the ink from the collection tank 531 to the supply tank 511 by the return liquid feeder 55 (Step S105) and raises the gas-liquid interface L2 inside the collection tank 531 while lowering the gas-liquid interface L1 inside the supply tank 511, to thereby perform the liquid level preparation (Steps S105 to S107). In such a configuration, it is possible to perform the liquid level preparation by using the differential pressure between the supply tank 511 and the collection tank 531, which is generated at the point in time when the printing performed by the ejection head 4 is ended.

Furthermore, when the controller 100 stops feeding of the ink by the return liquid feeder 55 for the liquid level preparation, the controller 100 causes the pressure adjustment part 52 to adjust the pressure P1 and causes the pressure adjustment part 54 to adjust the pressure P2, to thereby reduce the difference between the pressure P1 and the pressure P2 from the printing differential pressure ΔPp (Step S106). In such a configuration, the difference between the pressure P1 and the pressure P2 is reduced in advance before Step S108 in which the pressure adjustment performed by the pressure adjustment part 52 and the pressure adjustment part 54 is stopped. Therefore, it is possible to alleviate an impact imposed on a meniscus of the ink formed on the nozzle 42 at the stop of the pressure adjustment.

Further, the pressure adjustment part 52 has the pressure tank 521 (first pressure tank) connected to the supply tank 511, and the introduction pipe 524 and the pressurized valve 525 (first pressure generation part) which generate the supply pressure Pf by introducing the compressed air into the pressure tank 521. Then, the supply pressure Pf generated in the pressure tank 521 is applied onto the gas-liquid interface L1 inside the supply tank 511. Furthermore, the pressure adjustment part 54 has the pressure tank 541 (second pressure tank) connected to the collection tank 531, and the exhaust pipe 544, exhaust valve 545 and the exhaust pump 549 (second pressure generation part) which generate the collection pressure Pr by exhausting the pressure tank 541. Then, the collection pressure Pr generated in the pressure tank 541 is applied onto the gas-liquid interface L2 inside the collection tank 531. In such a configuration in which the supply pressure Pf and the collection pressure Pr are generated in the pressure tanks 521 and 541, respectively, variations in the compressed air introduced by the introduction pipe 524 and the exhaust by the exhaust pump 549 can be absorbed by the capacities of the pressure tanks 521 and 541, and it is possible to suppress any effect on the meniscus of the ink formed on the nozzle 42. It takes time, however, to generate the supply pressure Pf and the collection pressure Pr due to the capacities of the pressure tanks 521 and 541. Then, by performing the differential pressure generation assistance as described above, it becomes preferable to quickly generate the printing differential pressure ΔPp between the supply tank 511 and the collection tank 531.

Further, the head valve 513 (supply controller), which controls liquid feeding of the ink from the supply tank 511 to the ejection head 4, and the head valve 533 (collection controller), which controls liquid feeding of the ink from the ejection head 4 to the collection tank 531, are provided. The head valve 513 inhibits feeding of the ink from the supply tank 511 to the ejection head 4 during the execution of the printing differential pressure generation (Steps S111 to S115) and allows feeding of the ink from the supply tank 511 to the ejection head 4 (Step S116) after the printing differential pressure generation is completed ("YES" in Step S115). Further, the head valve 533 inhibits feeding of the ink from the ejection head 4 to the collection tank 531 during the execution of the printing differential pressure generation (Steps S111 to S115) and allows feeding of the ink from the ejection head 4 to the collection tank 531 after the printing differential pressure generation is completed ("YES" in Step S115). In such a configuration, during the execution of the printing differential pressure generation (Steps S111 to S115), the outflow of the ink from the supply tank 511 and the inflow of the ink into the collection tank 531 are inhibited. In other words, variations in the air layers Vra and Vfa due to the outflow and the inflow of the ink are prevented. As a result, it is possible to quickly generate the printing differential pressure ΔPp.

Figure 6A:
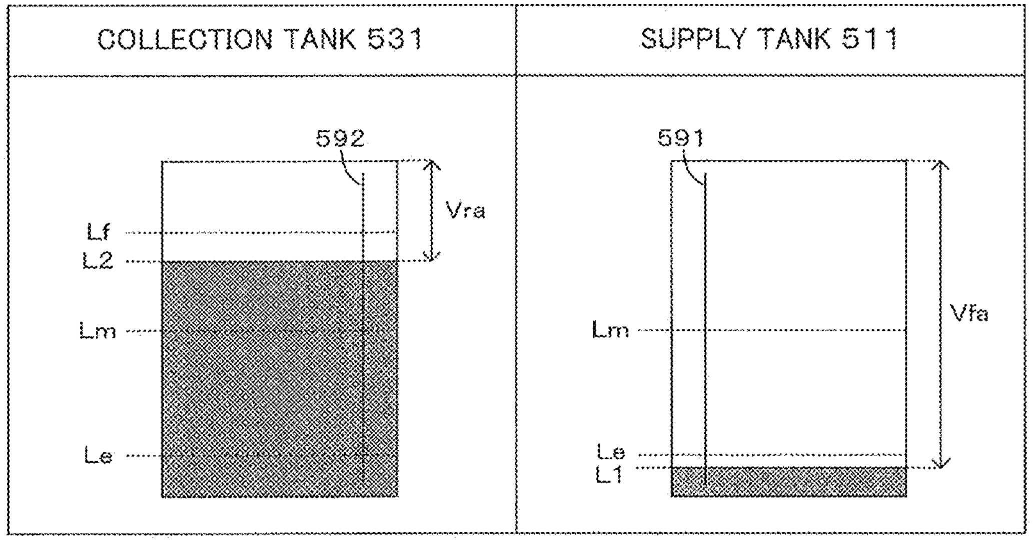
FIG. 6A A view schematically showing a variation of the operation performed along with the flowchart of FIG. 4.
Figure 6B:
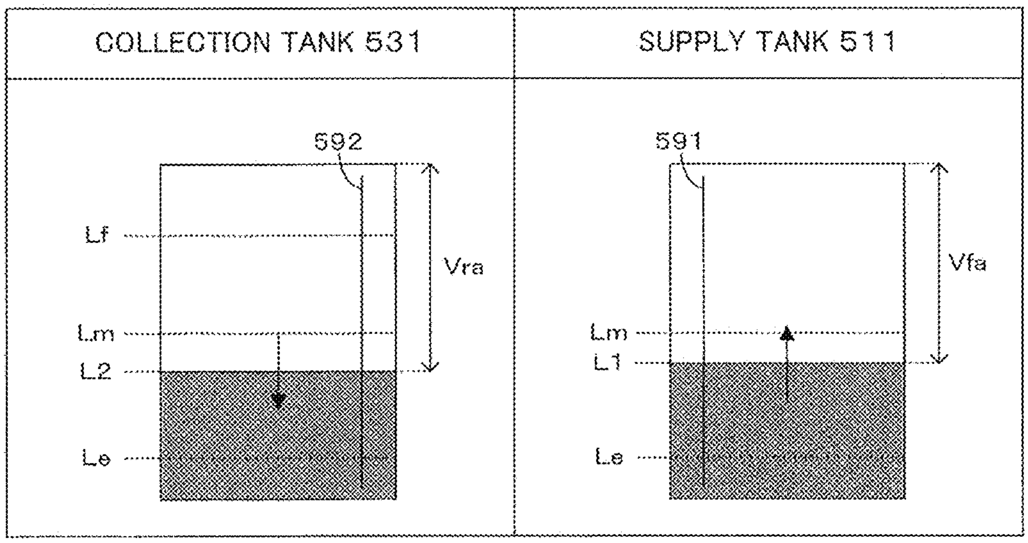
FIG. 6B A view schematically showing a variation of the operation performed along with the flowchart of FIG. 4.

FIGS. 6A and 6B are views each schematically showing a variation of the operation performed along with the flowchart of FIG. 4. In this variation, the controller 100 executes Steps S105 and S106, to thereby adjust the gas-liquid interface L1 and the gas-liquid interface L2 to the liquid level state (liquid level preparation state) shown in FIG. 6A (liquid level preparation).

In the liquid level state shown in FIG. 6A, the gas-liquid interface L1 inside the supply tank 511 is lower than the empty level Le and the gas-liquid interface L2 inside the collection tank 531 is equal to or higher than the middle level Lm (liquid level preparation state). In other words, when the gas-liquid interface L1 becomes lower than the empty level Le and the gas-liquid interface L2 becomes equal to or higher than the middle level Lm, the controller 100 determines that the liquid level preparation is completed and stops feeding of the ink (differential pressure liquid feeding) along the liquid feed path Ca by using the differential pressure between the pressure P1 and the pressure P2 (Step S108).

Further, when the controller 100 starts generation of the differential pressure in Step S111, the controller 100 starts the return pump 552 in Step S112. The ink is thereby fed from the collection tank 531 through the liquid feed path Cb to the supply tank 511. Therefore, as shown in FIG. 6B, in the supply tank 511, the gas-liquid interface L1 rises and the air layer Vfa above the gas-liquid interface L1 is compressed. For this reason, the air layer Vfa is pressurized and the pressure P1 increases. Furthermore, in the collection tank 531, the gas-liquid interface L2 is lowered and the air layer Vra above the gas-liquid interface L2 is expanded. For this reason, the air layer Vra is decompressed and the pressure P2 decreases. In other words, feeding of the ink by the return pump 552 assists generation of the differential pressure between the pressure P1 and the pressure P2.

Specifically, in this variation, before the printing differential pressure generation (Step S111) is started, the liquid level preparation to generate the liquid level preparation state (FIG. 6A) in which the gas-liquid interface L1 inside the supply tank 511 is at the empty level Le (lower than the first preparation liquid level) and the middle level Lm (collection gas-liquid interface) inside the collection tank 531 is equal to or higher than the middle level Lm (second preparation liquid level) is performed (Steps S105 to S107). It is thereby possible to perform the differential pressure generation (Steps S111 to S115) after ensuring the range of compression of the air layer Vfa in the supply tank 511 and the range of expansion of the air layer Vra in the collection tank 531. As a result, it becomes possible to quickly generate the printing differential pressure ΔPp between the supply tank 511 and the collection tank 531 and thereby reduce the time until the printing is started.

Figure 7:
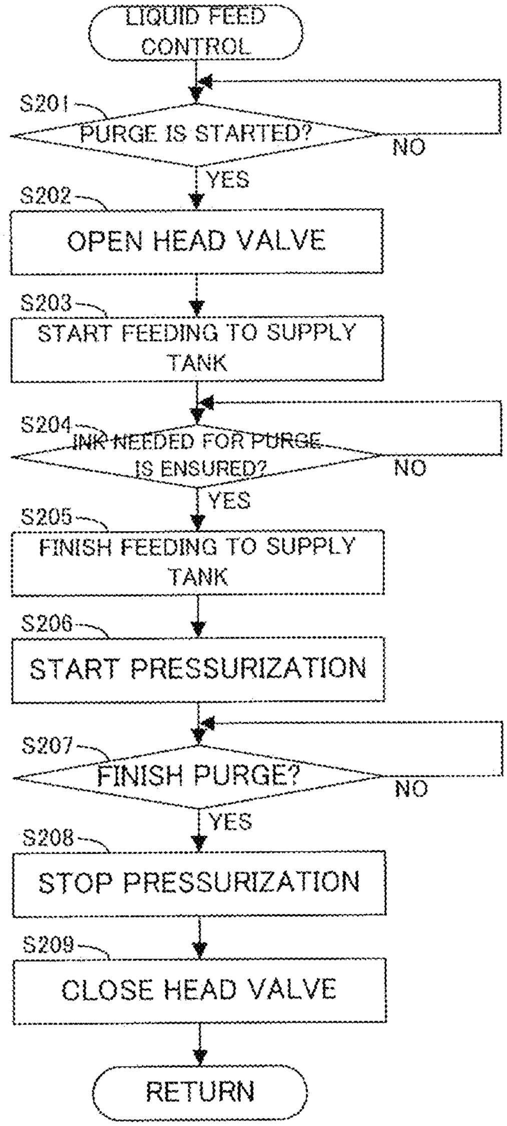
FIG. 7 A flowchart showing a variation of liquid feed control performed in the printing apparatus of FIG. 1.

FIG. 7 is a flowchart showing a variation of liquid feed control performed in the printing apparatus of FIG. 1. The flowchart of FIG. 7 is executed between Step S109 and Step S110 in the flowchart of FIG. 4. In other words, the flowchart of FIG. 7 is executed after the liquid level preparation in Steps S105 to S107 is completed and the head valve 513 and the head valve 533 are closed in Step S109, during a period while the start of the circulation is waited in Step S110. Further, herein, it is assumed that the liquid level preparation state shown in FIG. 5A is achieved in Steps S105 to S107.

In Step S201, the controller 100 determines whether to start the purge. When starting the purge ("YES" in Step S201), the controller 100 opens the head valve 513 provided for the ejection head 4 which is a target for the purge (Step S202). Feeding of the ink from the supply tank 511 to the ejection head 4 is thereby allowed.

In Step S203, the controller 100 operates the return pump 552 and the replenishment pump 582, to thereby feed the ink from the buffer tank 56 through the collection tank 531 to the supply tank 511. The controller 100 performs the feeding of the ink, for example, by controlling the amount of ink to be fed by the return pump 552 and the amount of ink to be fed by the replenishment pump 582 to be equal to each other. Alternatively, when the gas-liquid interface L2 inside the collection tank 531 becomes lower than the full level Lf, which is required for the liquid level preparation state (FIG. 5A), along with the feeding of the ink by the return pump 552 from the collection tank 531 to the supply tank 511, the controller 100 feeds the ink from the buffer tank 56 to the collection tank 531 so that the gas-liquid interface L2 can become equal to or higher than the full level Lf.

In Step S204, the controller 100 determines whether or not the amount of ink needed for the purge is ensured in the supply tank 511. Specifically, when the gas-liquid interface L1 inside the supply tank 511 becomes equal to or higher than the middle level Lm, the controller 100 determines that the amount of ink needed for the purge is ensured ("YES" in Step S204). Thus, when purge ink is ensured, the controller 100 finishes the feeding of the ink to the supply tank 511 (Step S205). Further, at the point in time when the feeding of the ink to the supply tank 511 is finished, by the feeding of the ink from the buffer tank 56 to the collection tank 531 in above-described Step S203, the gas-liquid interface L2 inside the collection tank 531 is equal to or higher than the full level Lf which is required for the liquid level preparation state (FIG. 5A).

In Step S206, the controller 100 closes the tank valve 523 and opens the purge valve 62 to introduce the compressed air into the supply tank 511, to thereby start pressurization of the supply tank 511. Thus, with the compressed air introduced into the supply tank 511, the ink flows into the ejection head 4 from the supply tank 511 and the ink flows out from the nozzle 42 of the ejection head 4 (purge).

Along with the execution of this purge, the gas-liquid interface L2 inside the supply tank 511 is lowered. Then, when the gas-liquid interface L1 inside the supply tank 511 becomes lower than the middle level Lm, which is required for the liquid level preparation state (FIG. 5A), the controller 100 determines to finish the purge ("YES" in Step S207) and stops the pressurization of the supply tank 511 (Step S208). Specifically, the controller 100 closes the purge valve 62 and opens the tank valve 523. The pressure P1 inside the supply tank 511 thereby becomes the atmosphere pressure. Then, the controller 100 closes the head valve 513 (Step S209).

In this variation, the purge mechanism 6 (purge execution part) performs purge to feed the ink from the supply tank 511 to the ejection head 4 and push the ink out from the nozzle 42 of the ejection head 4 by applying a purge pressure onto the gas-liquid interface L1 inside the supply tank 511. This purge mechanism 6 performs the purge before the printing differential pressure generation is started in Step S111 after the liquid level preparation is completed in Step S107 (FIG. 7). In response to this operation, the controller 100 causes the purge mechanism 6 to finish the purge in a state in which the gas-liquid interface L1 inside the supply tank 511 becomes lower than the middle level Lm (first preparation liquid level) along with the execution of the purge by the purge mechanism 6 (Step S207). In such a configuration, even when the liquid level preparation state (FIG. 5A) generated in the liquid level preparation in Step S107 is broken along with the execution of the purge (especially, along with ensuring of the purge ink), it is possible to recover the liquid level preparation state (FIG. 5A) at the end of the purge.

As described above, in the present embodiment, the printing apparatus 1 corresponds to one example of a "printing apparatus" of the present invention, the controller 100 corresponds to one example of a "controller" of the present invention, the ejection head 4 corresponds to one example of an "ejection head" of the present invention, the nozzle 42 corresponds to one example of a "nozzle" of the present invention, the supply tank 511 corresponds to one example of a "supply ink storage" of the present invention, the pressure adjustment part 52 corresponds to one example of a "first pressure adjustment part" of the present invention, the collection tank 531 corresponds to one example of a "collected ink storage" of the present invention, the pressure adjustment part 54 corresponds to one example of a "second pressure adjustment part" of the present invention, the return liquid feeder 55 corresponds to one example of a "return liquid feeder" of the present invention, the gas-liquid interface L1 corresponds to one example of a "supply gas-liquid interface" of the present invention, the gas-liquid interface L2 corresponds to one example of a "collection gas-liquid interface" of the present invention, the pressure P1 corresponds to one example of a "first pressure" of the present invention, the pressure P2 corresponds to one example of a "second pressure" of the present invention, the supply pressure Pf corresponds to one example of a "supply pressure" of the present invention, the collection pressure Pr corresponds to one example of a "collection pressure" of the present invention, the printing differential pressure ΔPp corresponds to one example of a "printing differential pressure" of the present invention, Steps S105 to S107 correspond to one example of a "liquid level preparation" of the present invention, and Steps S112 and S113 correspond to one example of a "differential pressure generation assistance" of the present invention.

Further, the present invention is not limited to the above-described embodiment, but numerous modifications and variations other than those described above can be devised without departing from the scope of the invention. For example, the generation of the liquid level preparation state shown in FIG. 5A or 6A may be performed by the ink feed amount adjustment part 5D. In other words, the ink feed amount adjustment part 5D has the buffer tank 56 (buffer ink storage), which stores the ink, the replenishment liquid feeder 58 (ink replenishment part), which feeds the ink from the buffer tank 56 to the collection tank 531, and the collection liquid feeder 57 (ink collector), which feeds the ink from the supply tank 511 to the buffer tank 56.

For this configuration, the controller 100 controls the feeding of the ink from the supply tank 511 to the buffer tank 56 by the collection liquid feeder 57 on the basis of the detection result of the liquid level detector 591 while controlling the feeding of the ink from the buffer tank 56 to the collection tank 531 by the replenishment liquid feeder 58 on the basis of the detection result of the liquid level detector 592. The liquid level preparation state shown in FIG. 5A or 6A is thereby generated (liquid level preparation). In such a configuration, by the replenishment of the ink from the buffer tank 56 to the collection tank 531 and the collection of the ink from the supply tank 511 to the buffer tank 56, the liquid level preparation can be performed.

Further, in the above-described embodiment, the pressure P1 inside the ink supply tank 511 is a positive pressure. Only if the magnitude relation in which the pressure P1 inside the ink supply tank 511 is equal to or higher than the pressure P2 inside the collection tank 531 is ensured, the pressure P1 inside the ink supply tank 511 may be a negative pressure. In this case, since the pressure inside the pressure 521 is also a negative pressure, it is preferable that the introduction pipe 524 should communicate with the exhaust pump, instead of the compressed air.

Figure 8:
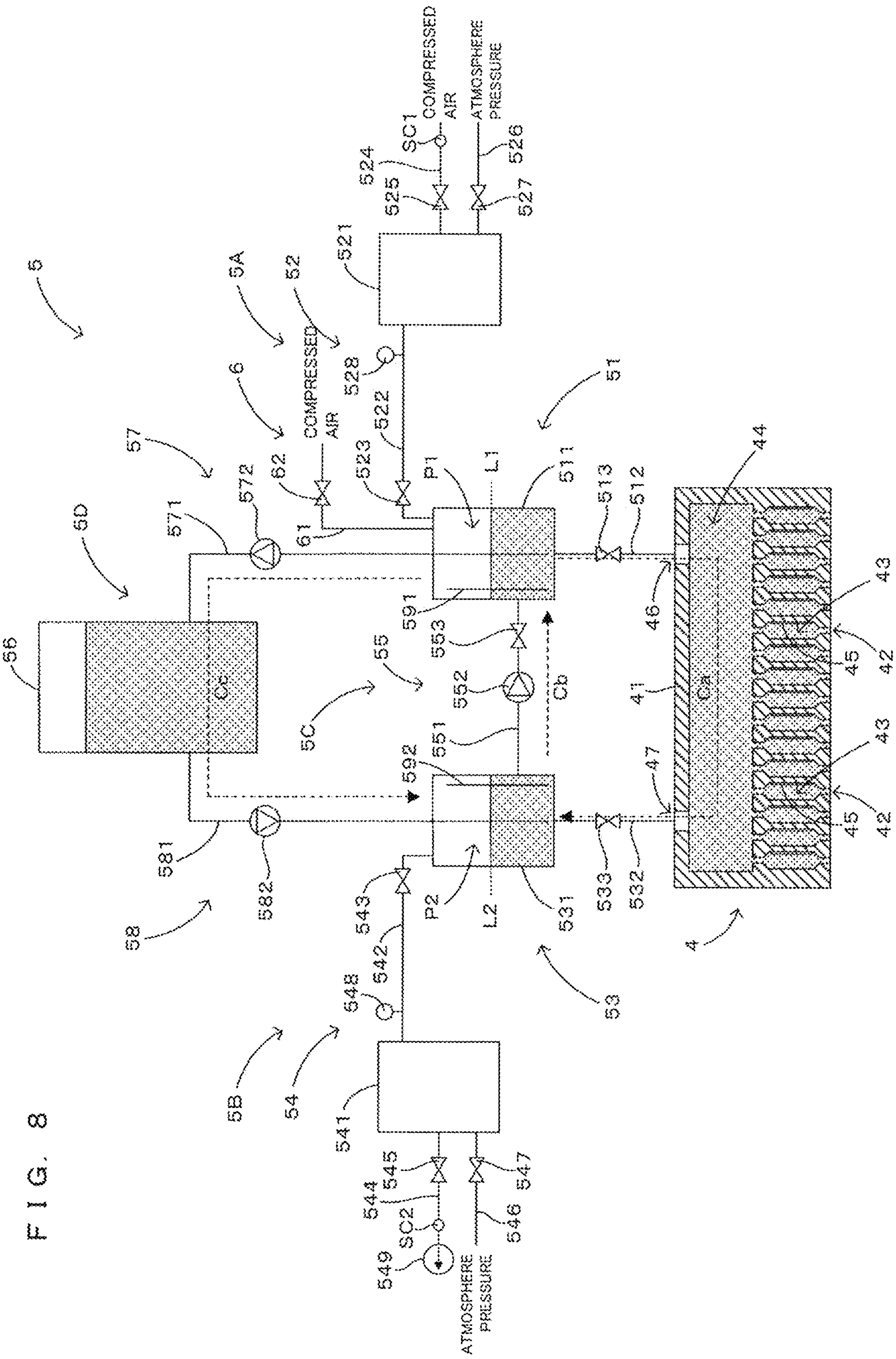
FIG. 8 A view schematically showing a variation of the ejection head and the ink feed mechanism provided for the ejection head.

FIG. 8 is a view schematically showing a variation of the ejection head and the ink feed mechanism provided for the ejection head. FIG. 8 is different from FIG. 2 in that speed controllers SC1 and SC2 are provided. Specifically, the pressure adjustment part 52 has a speed controller SC1 attached to the introduction pipe 524 which introduces the compressed air into the pressure tank 521. This speed controller SC1 limits inflow of the compressed air into the pressure tank 521. Further, the pressure adjustment part 54 has a speed controller SC2 attached to the exhaust pipe 544 which connects the exhaust pump 549 and the pressure tank 541 to each other. This speed controller SC2 limits outflow of air from the pressure tank 541 to the exhaust pump 549.

Thus, in such a configuration in which the speed controllers SC1 and SC2 are provided, variations in the compressed air introduced by the introduction pipe 524 and the exhaust by the exhaust pump 549 can be absorbed by the speed controllers SC1 and SC2, and it is possible to suppress any effect on the meniscus of the ink formed on the nozzle 42. It takes time, however, to generate the supply pressure Pf and the collection pressure Pr due to the limitation of an airflow by the speed controllers SC1 and SC2. Then, by performing the differential pressure generation assistance as described above, it becomes preferable to quickly generate the printing differential pressure ΔPp between the supply tank 511 and the collection tank 531.

INDUSTRIAL APPLICABILITY

The present invention can be applied to general printing technology for ejecting ink from an ejection head while feeding the ink form a supply ink storage, through the ejection head, to a collected ink storage by using a differential pressure generated between the supply ink storage, which stores the ink to be supplied to the ejection head, and the collected ink storage, which stores the ink collected from the ejection head.

EXPLANATION OF REFERENCE SIGNS

1 . . . printing apparatus
100 . . . controller
4 . . . ejection head
42 . . . nozzle
511 . . . supply tank (supply ink storage)
52 . . . pressure adjustment part (first pressure adjustment part)
531 . . . collection tank (collected ink storage)
54 . . . pressure adjustment part (second pressure adjustment part)
55 . . . return liquid feeder
L1 . . . gas-liquid interface (supply gas-liquid interface)
L2 . . . gas-liquid interface (collection gas-liquid interface)
P1 . . . pressure (first pressure)
P2 . . . pressure (second pressure)

The invention claimed is:

1. A printing apparatus, comprising:

an ejection head having a nozzle to eject ink;

a supply ink storage which stores ink to be supplied to the ejection head;

a collected ink storage which stores ink collected from the ejection head;

a return liquid feeder which feeds ink from the collected ink storage to the supply ink storage;

a first pressure adjustment part which adjusts a first pressure to be applied to a supply gas-liquid interface which is a boundary between the ink stored in the supply ink storage and air;

a second pressure adjustment part which adjusts a second pressure to be applied to a collection gas-liquid interface which is a boundary between the ink stored in the collected ink storage and air; and a controller which performs a printing differential pressure generation to adjust the first pressure by the first pressure adjustment part so that the first pressure becomes a supply pressure and adjust the second pressure by the second pressure adjustment part so that the second pressure becomes a collection pressure lower than the supply pressure, wherein when the printing differential pressure generation is completed by adjusting the first pressure to the supply pressure and adjusting the second pressure to the collection pressure, performed is printing ink feeding to feed the ink from the supply ink storage through the ejection head to the collected ink storage by using a printing differential pressure which is a difference between the supply pressure and the collection pressure, the ejection head performs printing by ejecting the ink supplied from the supply ink storage along with the printing ink feeding, from the nozzle, and the controller performs liquid level preparation to generate a liquid level preparation state in which the supply gas-liquid interface is lower than a first preparation liquid level and the collection gas-liquid interface is equal to or higher than a second preparation liquid level before the printing differential pressure generation is completed after the printing performed by the ejection head is ended, and causes the return liquid feeder to perform differential pressure generation assistance to feed the ink from the collected ink storage to the supply ink storage concurrently with execution of the printing differential pressure generation.

2. The printing apparatus according to claim 1, wherein the controller finishes the differential pressure generation assistance when the supply gas-liquid interface becomes equal to or higher than a first end liquid level.

3. The printing apparatus according to claim 2, wherein the controller finishes the differential pressure generation assistance when the collection gas-liquid interface becomes lower than a second end liquid level.

4. The printing apparatus according to claim 3, wherein when the printing performed by the ejection head is ended, the controller performs the liquid level preparation by stopping feeding the ink from the collected ink storage to the supply ink storage, which is performed by the return liquid feeder, and raising the collection gas-liquid interface while lowering the supply gas-liquid interface.

5. The printing apparatus according to claim 4, wherein when the controller stops feeding the ink by the return liquid feeder for the liquid level preparation, the controller reduces a difference between the first pressure and the second pressure from the printing differential pressure by causing the first pressure adjustment part to adjust the first pressure and causing the second pressure adjustment part to adjust the second pressure.

6. The printing apparatus according to claim 1, further comprising:

a buffer ink storage which stores the ink;

an ink replenishment part which feeds the ink from the buffer ink storage to the collected ink storage; and an ink collect part which feeds the ink from the supply ink storage to the buffer ink storage, wherein the controller performs the liquid level preparation by controlling liquid feeding of the ink from the buffer ink storage to the collected ink storage performed by the ink replenishment part and controlling liquid feeding of the ink from the supply ink storage to the buffer ink storage performed by the ink collect part.

7. The printing apparatus according to claim 1, wherein the first pressure adjustment part has a first pressure tank connected to the supply ink storage and a first pressure generation part generating the supply pressure in the first pressure tank and applies the supply pressure generated in the first pressure tank to the supply gas-liquid interface of the supply ink storage, and the second pressure adjustment part has a second pressure tank connected to the collected ink storage and a second pressure generation part generating the collection pressure in the second pressure tank and applies the collection pressure generated in the second pressure tank to the collection gas-liquid interface of the collected ink storage.

8. The printing apparatus according to claim 7, wherein the first pressure generation part has an introduction pipe, which introduces compressed air supplied from outside into the first pressure tank, and a first speed controller attached to the introduction pipe to limit inflow of the compressed air to the first pressure tank, and the second pressure generation part has an exhaust pump, which exhausts the second pressure tank, an exhaust pipe, which connects the exhaust pump and the second pressure tank to each other, and a second speed controller attached to the exhaust pipe to limit outflow of air from the second pressure tank to the exhaust pump.

9. The printing apparatus according to claim 1, further comprising:

a purge execution part which performs purge to feed the ink from the supply ink storage to the ejection head and push the ink out from the nozzle of the ejection head by applying a purge pressure to the supply gas-liquid interface, wherein the purge execution part performs the purge before the printing differential pressure generation is started after the liquid level preparation is ended, and the controller causes the purge execution part to finish the purge in a state in which the supply gas-liquid interface becomes lower than the first preparation liquid level, along with execution of the purge by the purge execution part.

10. The printing apparatus according to claim 1, further comprising:

a supply controller which controls liquid feeding of ink from the supply ink storage to the ejection head; and a collection controller which controls liquid feeding of ink from the ejection head to the collected ink storage, wherein the supply controller inhibits liquid feeding of ink from the supply ink storage to the ejection head during execution of the printing differential pressure generation while allowing liquid feeding of ink from the supply ink storage to the ejection head after the printing differential pressure generation is completed, and the collection controller inhibits liquid feeding of ink from the ejection head to the collected ink storage during execution of the printing differential pressure generation while allowing liquid feeding of ink from the ejection head to the collected ink storage after the printing differential pressure generation is completed.

11. The printing apparatus according to claim 1, wherein the differential pressure generation assistance is started after the liquid level preparation is completed.

12. The printing apparatus according to claim 1, wherein the printing differential pressure generation is started after the printing performed by the ejection head is ended and before the differential pressure generation assistance is started.

13. A printing method, comprising:

performing printing differential pressure generation to adjust a first pressure by a first pressure adjustment part for adjusting the first pressure to be applied to a supply gas-liquid interface which is a boundary between air and ink stored in a supply ink storage for storing the ink to be supplied to an ejection head having a nozzle for ejecting the ink, so that the first pressure becomes a supply pressure, and to adjust a second pressure by a second pressure adjustment part for adjusting the second pressure to be applied to a collection gas-liquid interface which is a boundary between air and ink stored in a collected ink storage for storing the ink collected from the ejection head, so that the second pressure becomes a collection pressure lower than the supply pressure;

performing printing ink feeding to feed the ink from the supply ink storage through the ejection head to the collected ink storage by using a printing differential pressure which is a difference between the supply pressure and the collection pressure by completing the printing differential pressure generation by adjusting the first pressure to the supply pressure and adjusting the second pressure to the collection pressure; and performing printing by the ejection head by ejecting the ink supplied from the supply ink storage along with the printing ink feeding, from the nozzle, wherein liquid level preparation to generate a liquid level preparation state in which the supply gas-liquid interface is lower than a first preparation liquid level and the collection gas-liquid interface is equal to or higher than a second preparation liquid level is performed before the printing differential pressure generation is completed, and differential pressure generation assistance to feed the ink from the collected ink storage to the supply ink storage by a return liquid feeder for feeding the ink from the collected ink storage to the supply ink storage is performed concurrently with execution of the printing differential pressure generation.

* * * * *